United States Patent [19]

Lira

[11] Patent Number: 5,468,375
[45] Date of Patent: Nov. 21, 1995

[54] WASTEWATER PRETREATMENT TANK ASSEMBLY

[75] Inventor: Joseph R. Lira, Fayetteville, N.Y.

[73] Assignee: Nova Power Systems, Ltd., Fayetteville, N.Y.

[21] Appl. No.: 239,745

[22] Filed: May 9, 1994

[51] Int. Cl.⁶ .................................................. B01D 21/30
[52] U.S. Cl. .......................... 210/139; 210/199; 210/219; 210/521; 210/533
[58] Field of Search ..................... 210/139, 199, 210/202, 207, 218, 219, 220, 248, 319, 320, 521, 607, 631, 790, 903, 533

[56] References Cited

U.S. PATENT DOCUMENTS

| | | | |
|---|---|---|---|
| 891,742 | 6/1908 | Smith | 210/127 |
| 2,901,114 | 8/1959 | Smith et al. | 210/202 |
| 2,907,463 | 10/1959 | Light et al. | 210/202 |
| 3,487,937 | 1/1970 | Koulovatos | 210/199 |
| 3,655,050 | 4/1972 | Fifer | 210/218 |
| 3,741,393 | 6/1973 | Estes et al. | 210/195.4 |
| 3,794,176 | 2/1974 | Schnyder | 210/220 |
| 3,875,056 | 4/1975 | Inglis | 210/220 |
| 3,879,285 | 4/1975 | Yost | 210/220 |
| 3,907,672 | 9/1975 | Milne | 210/199 |
| 4,021,347 | 5/1977 | Teller et al. | 210/220 |
| 4,190,539 | 2/1980 | Besik | 210/202 |
| 4,211,655 | 7/1980 | Jordan | 210/108 |
| 4,372,856 | 2/1983 | Morrison | 210/218 |
| 4,664,795 | 5/1987 | Stegall et al. | 210/202 |
| 4,690,755 | 9/1987 | Friedman et al. | 210/96.1 |
| 4,818,392 | 4/1989 | Werner et al. | 210/521 |
| 4,933,076 | 6/1990 | Oshima et al. | 210/631 |
| 5,162,083 | 11/1992 | Forbes et al. | 210/199 |
| 5,186,821 | 2/1993 | Murphy | 210/139 |

*Primary Examiner*—Joseph W. Drodge
*Assistant Examiner*—Kenneth M. Jones
*Attorney, Agent, or Firm*—Trapani & Molldrem

[57] ABSTRACT

A wastewater pretreatment tank assembly reduces the amount of solid matter on sludge in household sewage before the wastewater is introduced into a municipal sewage treatment system. Bacteria and enzymes are added to the wastewater in a first chamber where the sludge is digested. Then the wastewater spills over a weir into another chamber where ammonia is stripped. The wastewater is aerated and optionally chlorinated. The pretreatment of household sewage reduces the burden on the municipal sewage treatment facility, and reduces the risk of exceeding the capacity of the facility.

11 Claims, 2 Drawing Sheets

WASTEWATER PRETREATMENT TANK ASSEMBLY

BACKGROUND OF THE INVENTION

This invention relates to the treatment of sewage and wastewater, and is more particularly concerned with a wastewater pretreatment arrangement for pretreating household sewage locally before it is discharged into a municipal sewage treatment system.

In most municipalities, households and commercial establishments discharge wastewater into a municipal sewage system, in which a network of sewers carries the liquid and entrained waste matter to a central sewage treatment facility. At that facility, the wastewater is fed to a settling tank or basin where sludge, or solid organic matter, is contacted with either aerobic or anaerobic microorganisms, which digest the sludge and convert it into lower order molecular matter i.e., fermenting the sludge to produce $CO_2$, $H_2O$, other gases, and an inert silt-like solid by-product. The liquid waste is treated to remove ammonia, phosphorus and other dissolved matter before the water is returned into the environment.

Homeowners who are not connected to a municipal sewage treatment system can employ a septic tank to receive the household wastewater and digest sludge from the wastewater. Then the liquid portion is discharged into the soil. Septic systems do not remove nitrogen or ammonia from the effluent. Also, there is no means in the septic tank for automatically removing the accumulated matter that remains from the reduction of sludge. It is therefore necessary periodically to pump the sludge out of septic tanks to prevent them from overfilling and clogging.

Because of population growth in many urban regions, the amount of waste being generated places the municipal sewage treatment facility at full capacity, and in many instances above full capacity. Consequently, overburdened treatment systems must frequently bypass the raw sewage around the facility, and this results in raw contaminated wastewater directly entering lakes and rivers.

Therefore there has been great concern about how to reduce the burden imposed on the municipal sewage treatment facility, but no means have been available to do this. In particular, no suitable pre-treatment device or arrangement has been available to reduce the waste burden at the household before the wastewater enters the municipal sewer system.

OBJECTS AND SUMMARY OF THE INVENTION

It is an object of this invention to provide an appliance, device, or machine that pretreats wastewater or sewage at the household or local level before the sewage enters the municipal sewage system, and thereby reducing the burden on the sewage treatment facility.

It is a more particular object to reduce the amount of solid matter, or sludge in the effluent wastewater from a home or business, and to reduce the amount of nitrogen and ammonia remaining in the wastewater.

It is a further object to carry out the wastewater pretreatment in a manner that is economical and gentle, and does not involve any toxic or dangerous chemicals.

In accordance with an aspect of this invention a pretreatment tank assembly is interposed between the wastewater source, e.g., a home drain pipe, and a sewer drain that leads into the municipal sewage system. The tank assembly employs a tank shell that has a top side, a bottom side, end walls, and first and second internal weirs or bulkheads. For example, a pretreatment tank that serves a single family dwelling can be a cylindrical tank about two feet in diameter and five and one-half feet long, with a 135 gallon capacity. For a commercial establishment, such as a restaurant or hotel, a larger tank assembly would be required.

In the tank there are three separate compartments. A main or digestion chamber, which can be about four feet long, is defined between one end wall and the first weir. The home drain pipe empties into this chamber, and an automatic mechanism adds a small, measured amount of a bacteria and enzymes additive (in dry powder form) at a predetermined interval, i.e., once each 24 hours. These bacteria and enzymes are commercially available for sewage treatment, and are not disease-causing or harmful. The bacteria/enzymes combination can liquify the waste matter at a ratio of 25:1 in about a 24 hour period. In other words, the digestion chamber reduces the amount of sludge by about 96%.

The liquid in the digestion chamber spills over the first weir into a second, or stripping chamber that is defined between the first and second weirs. Here an ammonia stripping compound is added automatically. In practice, a measured amount of soda ash can be added by an auger feeder. At the same time, air is injected through a sparger to aerate and mix the water in this chamber. Then the water spills over the second weir into a third chamber defined between the second weir and the second end wall. Here, chlorine can be added for bacteria control, and the water can be aerated again with a sparger or aerator. Alternatively, ozone or another bactericide can be injected for bacteria control. The pretreated wastewater spills out through an overflow pipe into an outlet that connects to the sewer system.

A sludge evacuation bypass conduit is provided for periodically flushing the sludge residue from the bottom of the first, or digestion chamber. An inlet end of the conduit is in communication with the bottom of the digestion chamber, and the other end connects to the sewer system. The overflow pipe can favorably be teed into the sludge bypass conduit. A sluice valve or gate valve is interposed in the bypass conduit and is motorized so it can be opened automatically at scheduled times, but remain closed otherwise. For most households, sludge evacuation can be carried out approximately monthly or bi-monthly.

A water jet is employed as a turbulence generator and is located near the inlet end of the sludge bypass conduit to prevent the sludge from clogging during evacuation. Also an anti-backup check valve can be employed at the discharge end of the tank assembly to prevent sewage from backing up into the tank.

A deodorant can be injected, for example with the bacteria and enzymes, to control unpleasant odors.

In this system, the burden of sewage treatment is widely distributed among households and businesses, and each would have a pretreatment tank and would pretreat its own waste. This enormously reduces the burden on the central sewage treatment facility. Thus widespread use of this invention minimizes the risk that the sewage load would swamp the capacity of the sewage treatment plant to handle it.

The pretreatment tank assemblies are inexpensive and can be easily installed. The tank can be steel, fiberglass, or any other suitable material. Either plastic or metal pipes can be used.

The above and many other objects, features, and advantages of this invention will become apparent to persons skilled in the art from the ensuing description of a preferred embodiment, to be read in conjunction with the accompanying Drawing.

BRIEF DESCRIPTION OF THE PREFERRED DRAWINGS

DETAILED DESCRIPTION OF THE PREFERRED EMBODIMENT

Figure 1:
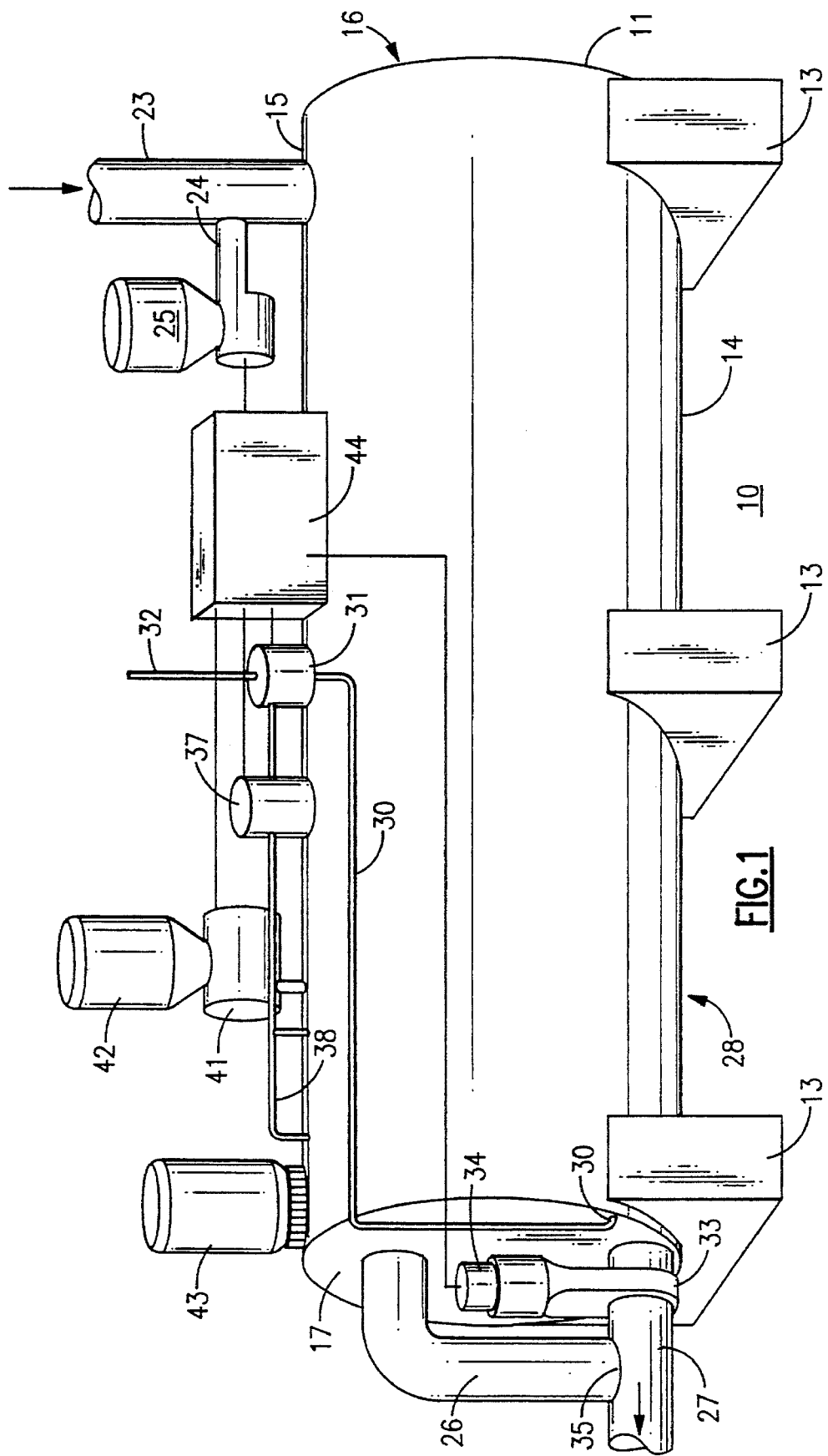
FIG. 1 is a perspective view of a pretreatment tank assembly according to one preferred embodiment of this invention.
Figure 2:
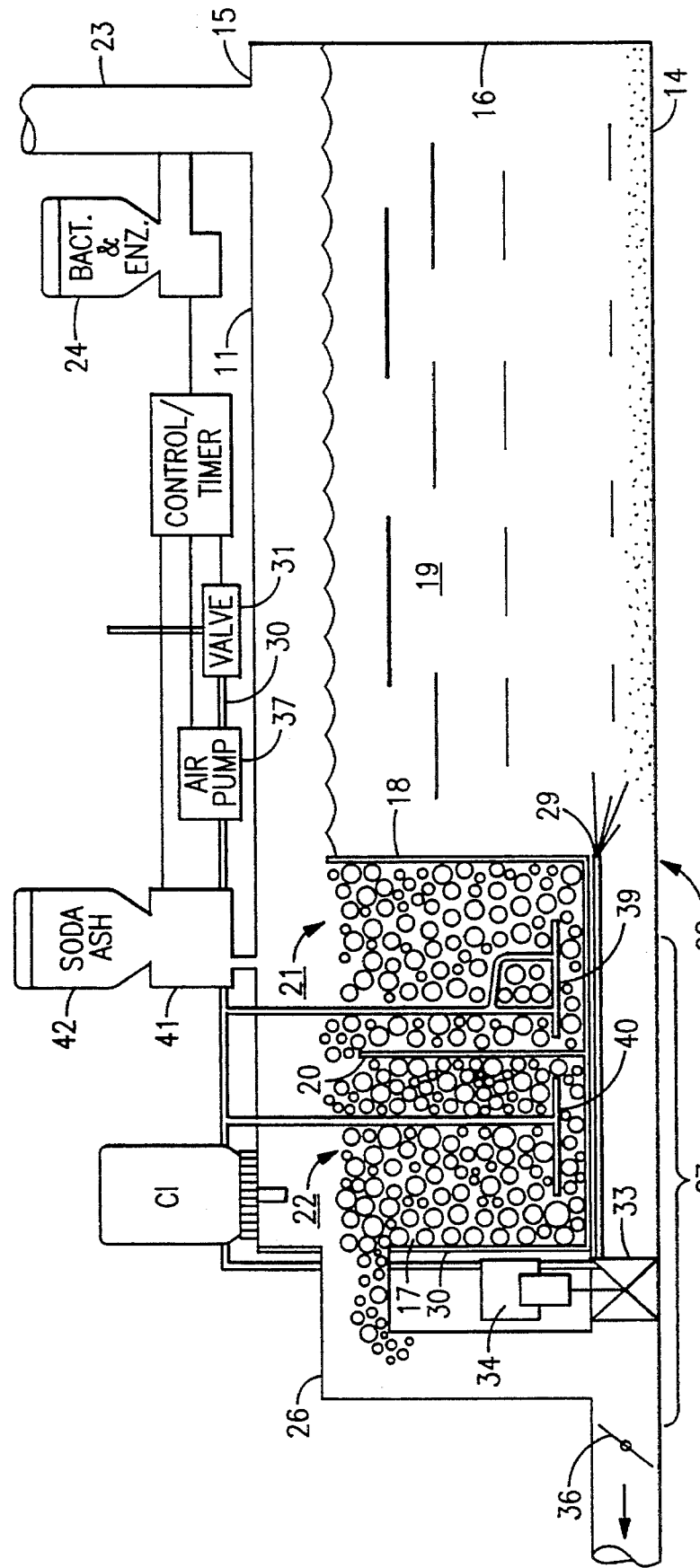
FIG. 2 is a schematic elevational view of the pretreatment tank of this invention.

With reference to FIGS. 1 and 2 of the Drawing, a wastewater pretreatment tank assembly 10 comprises a tank or shell 11, here in the form of a tubular or cylindrical tank. The tank or shell 11 is disposed horizontally, and supported on feet 13 attached to a lower or bottom side 14, with an opposite side forming the top side 15. A first end wall 16 is shown on the right in these drawing figures, with a second end wall 17 being situated on the left. As shown in FIG. 2 a first weir or bulkhead 18 is spaced about four feet from the first wall 16 and defines a digestion chamber 19. It is in this chamber 19 that the solid matter in the wastewater is digested or fermented. A second weir 20, is spaced about one foot from the first weir, and these weirs define between them a stripping chamber 21. Here water that spills over the first weir 18 is stripped of any ammonia in the wastewater and aerated. A third chamber 22 is defined between the second weir 20 and the end wall 17. In this chamber 22 water that spills over the second weir 20 is aerated and, optionally, is chlorinated. Then the water spills out into an overflow pipe 23 to exit the assembly 10.

A drain inlet pipe 24 is connected to the household drain to receive water from the various sinks and toilets in the home or other building. This pipe 24 brings the wastewater into the digestion chamber 19. An auger feed mechanism 25 attached to the inlet pipe introduces an additive that contains a mixture of bacteria and enzymes from a dry materials hopper 26 into the chamber 19. The bacteria and enzymes break down the solid matter or sludge into water, carbon dioxide and other by-products. This also leaves a silt-like solid residue that is approximately one twenty-fifth the volume of the original solid mass. A deodorant can be mixed in with the bacteria and enzymes, and dispensed at this stage.

A sludge evacuation bypass conduit 27 is situated in communication with the digestion chamber 19 to permit the periodic flushing of the sludge residue from the bottom of the digestion chamber 19. This conduit has an inlet end 28 in communication with the chamber 19 at the bottom side 14 of the tank. A water jet 29 here is disposed in the chamber 19 adjacent the inlet end 28 to serve as a turbulence generator so that the sludge and residue do not clog during a sludge-flushing procedure. The jet 29 is connected by tubing 30 to an electrically controlled valve 31, which is connected to a water supply through tubing 32.

A sluice valve or gate type valve 33 is disposed on the sludge evacuation conduit 27. This valve has an associated motor 34 which raises or lowers the gate of the sluice valve. The overflow pipe 24 joins the bypass conduit 27 at a tee coupling 35 downstream of the sluice valve 33. A sewer check valve 36 is situated in the conduit 27 downstream of the tee coupling, and serves to prevent downstream wastewater from the sewage system from backing up into the tank assembly 10. The bacteria and enzymes in the effluent tend to keep this check valve free of solid matter.

Shown atop the tank shell 11 is an air pump 37 which is connected by an air conduit 38 to a sparger 39 in the chamber 21 and another sparger 40 in the chamber 22. The spargers 39,40 aerate the wastewater in the chambers by bubbling, and ensure adequate mixing.

An auger feed dispenser 41 is situated over the chamber 21 and periodically meters out a predetermined quantity of soda ash from a hopper 42. The soda ash neutralizes any ammonia in the wastewater.

An automatic chlorinator 43 holds a supply of a liquid chlorinating compound, and periodically injects a predetermined quantity of it into the last chamber 22. The chlorinating compound is considered safe to handle and is environmentally gentle, the compound being the same type that is frequently used in swimming pools.

Finally a timer and control mechanism 44, which is coupled by a wiring harness to the auger feed mechanisms 25, 41, the gate valve motor 34, the air pump 37, the water jet valve 31, and the chlorinator 43, controls the timing and activation of the system, and controls the purge or flush cycle wherein the sludge residue is flushed downstream into the sewage system.

In this pretreatment system, no acids, dyes or caustic substances are added which would be harmful to the environment or would interfere with any subsequent waste treatment.

The pretreatment tank can be simply scaled up to pretreat wastewater from a larger establishment, such as a multiple-unit dwelling or a restaurant.

In this preferred embodiment the tank is made of steel, but in practice many suitable materials can be employed, including many synthetic plastics.

While the invention has been described with reference to a specific embodiment, it should be appreciated that the invention is not limited to that embodiment. Rather many modifications and variations would present themselves to persons skilled in this an without departing from the scope and spirit of the invention, as defined in the appended claims.

What is claimed is:

1. Wastewater pretreatment tank assembly to be interposed between a wastewater source and a sewer system that leads to a downstream treatment facility, the tank assembly comprising a shell having a bottom, a top, first and second end walls, and first and second weirs interposed between the end walls, said first end wall and said first weir defining a first chamber; means coupled to said wastewater source for introducing wastewater into said first chamber so that sludge in said wastewater settles to the bottom in said first chamber and is digested; the first and second weirs defining a second, stripping chamber, and including means for stripping ammonia from wastewater that has spilled from said first chamber over said first weir into said second chamber; said second weir and said second end wall defining a third aeration chamber, and including means for aerating wastewater in said third chamber that has spilled over said second weir; a drain overflow constructed and arranged for directing aerated wastewater into said sewer system and having a port open to said third chamber for conveying wastewater from said third chamber into said sewer system; and a sludge evacuation conduit having an inlet end in communication with the bottom of said first chamber, an outlet end connectable to said sewer system, and valve means interposed in said sludge evacuation conduit and connectable for normally retaining in said first chamber wastewater and sludge, up to the level of said first weir, and that is selectively openable for permitting discharge of the digested sludge from the first chamber into said sewer system.

2. Wastewater pretreatment tank assembly according to claim 1, further comprising a turbulence generator disposed adjacent the inlet end of said sludge evacuation conduit.

3. Wastewater pretreatment tank assembly according to claim 2, wherein said turbulence generator includes a water jet.

4. Wastewater pretreatment tank assembly according to claim 1, wherein said valve means includes a sluice valve having a gate that is lifted to open the sluice valve, and means for automatically raising said sluice valve gate at scheduled times for automatically discharging the digested sludge.

5. Wastewater pretreatment tank assembly according to claim 1, further comprising automatic dispensing means for adding into said first chamber, at predetermined intervals a bacteria and enzymes additive to promote digestion of the sludge in the first chamber.

6. Wastewater pretreatment tank assembly according to claim 5, wherein said automatic dispensing means includes an automatic feeder mechanism for transferring a predetermined amount of said bacteria and enzymes additive from a hopper containing said additive.

7. Wastewater pretreatment tank assembly according to claim 1, further comprising automatic dispensing means for adding automatically into said second chamber an ammonia stripping compound.

8. Wastewater pretreatment tank assembly according to claim 7, wherein said automatic dispensing means includes an automatic feeder mechanism for transferring a predetermined amount of said ammonia stripping compound from a hopper containing said compound.

9. Wastewater pretreatment tank assembly according to claim 1, wherein said aerating means includes an air pump disposed on the exterior of said shell, a sparger disposed at a bottom of said third chamber, and an air conduit connecting the pump to said sparger.

10. Wastewater pretreatment tank assembly according to claim 1, further comprising means for automatically dispensing a chlorinizing fluid into said third chamber.

11. Wastewater pretreatment tank assembly according to claim 1, wherein said drain overflow and said sludge evacuation conduit connect at a junction downstream of said valve means; the tank assembly further including sewage check valve means downstream of said junction to prevent sewage in said sewer conduit from backing up into said tank assembly.

* * * * *